(12) United States Patent
Jo

(10) Patent No.: US 9,030,759 B2
(45) Date of Patent: May 12, 2015

(54) IMAGING LENS

(71) Applicant: Samsung Electro-Mechanics Co., Ltd., Suwon-Si (KR)

(72) Inventor: Yong Joo Jo, Hwaseong-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/450,207

(22) Filed: Aug. 1, 2014

(65) Prior Publication Data

US 2014/0334017 A1    Nov. 13, 2014

Related U.S. Application Data

(63) Continuation of application No. 14/135,203, filed on Dec. 19, 2013, now Pat. No. 8,830,596, which is a continuation of application No. 13/533,769, filed on Jun. 26, 2012, now Pat. No. 8,736,983.

(30) Foreign Application Priority Data

Oct. 21, 2011    (KR) .......................... 10-2011-0108128

(51) Int. Cl.
  *G02B 9/60*  (2006.01)
  *G02B 13/00* (2006.01)
  *G02B 13/18* (2006.01)
  *G02B 3/04*  (2006.01)

(52) U.S. Cl.
  CPC .............. *G02B 9/60* (2013.01); *G02B 13/0045* (2013.01); *G02B 13/18* (2013.01); *G02B 3/04* (2013.01)

(58) Field of Classification Search
  CPC ........................................................ G02B 9/60
  USPC .......................................... 359/708, 713, 714
  See application file for complete search history.

(56) References Cited

U.S. PATENT DOCUMENTS

| | | | |
|---|---|---|---|
| 7,443,610 | B1 | 10/2008 | Lin et al. |
| 7,502,181 | B2 | 3/2009 | Shinohara |
| 8,035,723 | B2 | 10/2011 | Sano et al. |
| 8,072,695 | B1 | 12/2011 | Lee et al. |

(Continued)

FOREIGN PATENT DOCUMENTS

| | | |
|---|---|---|
| JP | 09-211320 | 8/1997 |
| JP | 2007-298572 | 11/2007 |

(Continued)

OTHER PUBLICATIONS

Office Action dated Feb. 26, 2014 and Prior Art Search Report for Korean Patent Appl. No. 10-2014-0003271 and its English translation provided by the Applicant's foreign counsel.

(Continued)

*Primary Examiner* — Scott J Sugarman
*Assistant Examiner* — William R Alexander
(74) *Attorney, Agent, or Firm* — Ladas & Parry, LLP

(57) ABSTRACT

Disclosed herein is an imaging lens, including: a first lens having positive (+) power and being biconvex; a second lens having negative (−) power and being concave toward an image side; a third lens having positive (+) power and being biconvex; a fourth lens having positive (+) power and being convex toward the image side; and a fifth lens having negative (−) power and being concave toward the image side, wherein the first lens, the second lens, the third lens, the fourth lens, and the fifth lens are sequentially disposed from an object side.

30 Claims, 4 Drawing Sheets

(56) References Cited

U.S. PATENT DOCUMENTS

| | | |
|---|---|---|
| 8,179,615 B1 | 5/2012 | Tang et al. |
| 8,264,784 B2 | 9/2012 | You |
| 8,325,429 B2 | 12/2012 | Tang et al. |
| 8,395,851 B2 | 3/2013 | Tang et al. |
| 8,411,374 B2 | 4/2013 | Ohtsu |
| 8,411,376 B2 | 4/2013 | Kubota |
| 8,456,758 B1 | 6/2013 | Huang et al. |
| 8,498,061 B2 | 7/2013 | Sano |
| 8,520,124 B2 | 8/2013 | Ozaki |
| 8,576,498 B2 | 11/2013 | Huang |
| 8,675,288 B2 | 3/2014 | Jung et al. |
| 8,736,983 B2 | 5/2014 | Jo |
| 8,773,768 B2 | 7/2014 | Jung et al. |
| 8,773,769 B2 | 7/2014 | Jung et al. |
| 8,773,770 B2 | 7/2014 | Jung et al. |
| 8,773,780 B2 | 7/2014 | You |
| 8,773,781 B2 | 7/2014 | Jo |
| 8,780,465 B2 | 7/2014 | Chae |
| 8,786,966 B2 | 7/2014 | You |
| 8,810,929 B2 | 8/2014 | You |
| 8,830,596 B2 | 9/2014 | Jo |
| 2007/0229984 A1 | 10/2007 | Shinohara |
| 2010/0220229 A1 | 9/2010 | Sano |
| 2010/0253829 A1 | 10/2010 | Shinohara |
| 2010/0254029 A1 | 10/2010 | Shinohara |
| 2011/0013069 A1 | 1/2011 | Chen |
| 2011/0134305 A1 | 6/2011 | Sano et al. |
| 2011/0164327 A1 | 7/2011 | Sato |
| 2011/0188131 A1 | 8/2011 | Sano |
| 2011/0249346 A1 | 10/2011 | Tang et al. |
| 2011/0273611 A1* | 11/2011 | Matsusaka et al. ........... 348/345 |
| 2012/0087019 A1 | 4/2012 | Tang et al. |
| 2012/0087020 A1 | 4/2012 | Tang et al. |
| 2012/0140104 A1 | 6/2012 | Ozaki |
| 2012/0314301 A1 | 12/2012 | Huang |
| 2013/0027788 A1 | 1/2013 | Yen |
| 2013/0050847 A1 | 2/2013 | Hsu et al. |
| 2013/0070346 A1 | 3/2013 | Hsu |
| 2013/0088788 A1 | 4/2013 | You |
| 2013/0093938 A1 | 4/2013 | Otsu |
| 2013/0094098 A1 | 4/2013 | Ko |
| 2013/0114151 A1 | 5/2013 | Chen et al. |
| 2013/0120858 A1 | 5/2013 | Sano |
| 2013/0201568 A1 | 8/2013 | Tsai et al. |
| 2013/0208174 A1 | 8/2013 | Tamura |
| 2013/0271642 A1 | 10/2013 | Sano |
| 2013/0286488 A1 | 10/2013 | Chae |
| 2013/0301147 A1 | 11/2013 | Yamada |
| 2013/0314803 A1 | 11/2013 | Huang et al. |
| 2013/0329307 A1 | 12/2013 | Jung et al. |
| 2013/0335622 A1 | 12/2013 | Kwon |
| 2013/0342919 A1 | 12/2013 | Tang et al. |
| 2014/0015991 A1 | 1/2014 | Yamada et al. |
| 2014/0104704 A1 | 4/2014 | Chae |
| 2014/0139935 A1 | 5/2014 | Hsieh et al. |
| 2014/0146402 A1 | 5/2014 | You |
| 2014/0218812 A1 | 8/2014 | Liou et al. |
| 2014/0254030 A1 | 9/2014 | Hsu et al. |
| 2014/0285907 A1 | 9/2014 | Tang et al. |
| 2014/0307149 A1 | 10/2014 | Chen et al. |
| 2014/0320986 A1 | 10/2014 | You |
| 2014/0368928 A1 | 12/2014 | Jo |
| 2014/0368929 A1 | 12/2014 | Chae |
| 2014/0368930 A1 | 12/2014 | Jung |
| 2014/0368932 A1 | 12/2014 | You |

FOREIGN PATENT DOCUMENTS

| | | | |
|---|---|---|---|
| JP | 2009-294528 | 12/2009 | |
| JP | 2010-256608 | 11/2010 | |
| JP | 2011-039091 | 2/2011 | |
| JP | WO 2011/027690 | * 3/2011 | ............. G02B 13/00 |
| JP | 2011-085733 | 4/2011 | |
| JP | 2011-138175 | 7/2011 | |
| JP | 2011-141396 | 7/2011 | |
| JP | 2011-158508 | 8/2011 | |
| JP | 2011-209554 | 10/2011 | |
| JP | 2011-257448 | 12/2011 | |
| JP | 2012-008164 | 1/2012 | |
| JP | 2012-073642 | 4/2012 | |
| JP | 2013-011710 | 1/2013 | |
| JP | 2013/054099 | 3/2013 | |
| KR | 10-2007-0097369 | 10/2007 | |
| KR | 10-2010-0001525 | 1/2010 | |
| KR | 10-2010-0043667 | 4/2010 | |
| KR | 10-2011-0042382 | 4/2011 | |
| KR | 10-2011-0057625 | 6/2011 | |
| KR | 10-2011-0071554 | 6/2011 | |
| KR | 10-2011-0140040 | 12/2011 | |
| KR | 10-2012-0018573 | 3/2012 | |
| KR | 10-2012-0033866 | 4/2012 | |
| TW | 201248187 A | 12/2012 | |
| TW | 201326884 A | 7/2013 | |
| TW | 201333517 A | 8/2013 | |
| TW | 201341840 A | 10/2013 | |
| TW | 201348732 A | 12/2013 | |
| WO | 2010/024198 | 3/2010 | |
| WO | 2011/021271 | 2/2011 | |

OTHER PUBLICATIONS

Office Action dated Jul. 1, 2013 for Korean Patent Appl. No. 10-2012-0045609 and its English translation provided by the Applicant's foreign counsel.

Office Action dated Aug. 26, 2014 for Korean Patent Appl. No. 10-2014-0097555 and its English translation provided by the Applicant's foreign counsel.

Office Action dated Aug. 27, 2014 for Korean Patent Appl. No. 10-2013-0065734 and its English summary provided by the Applicant's foreign counsel.

Office Action dated Aug. 29, 2014 for Korean Patent Appl. No. 10-2014-0097556 and its English summary provided by the Applicant's foreign counsel.

Office Action dated Sep. 25, 2013 for Japanese Patent Appl. No. 2012-181553 and its English summary provided by the Applicant's foreign counsel.

Office Action dated Jan. 28, 2014 and Prior Art Search Report for Korean Patent Appl. No. 10-2013-0150984 and its English translation provided by the Applicant's foreign counsel.

Office Action dated Jan. 28, 2013 for Korean Patent Appl. No. 10-2011-0108128 and its English summary provided by Applicant's foreign counsel.

Office Action dated Nov. 26, 2014 for Taiwanese Patent Appl. No. 102144927 and its English summary provided by Applicant's foreign counsel.

Office Action dated Jan. 21, 2013 for Korean Patent Appl. No. 10-2011-0103101 and its English summary provided by the Applicant's foreign counsel.

Notice of Allowance dated Mar. 27, 2014 for U.S. Appl. No. 13/533,769 (now issued as U.S. 8,736,983).

Non-Final Office Action dated Sep. 5, 2013 for U.S. Appl. No. 13/533,769 (now issued as U.S. 8,736,983).

Notice of Allowance dated May 30, 2014 for U.S. Appl. No. 14/135,152 (now issued as U.S. 8,773,781).

Non-Final Office Action dated Apr. 3, 2014 for U.S. Appl. No. 14/135,152 (now issued as U.S. 8,773,781).

Notice of Allowance dated Jul. 21, 2014 for U.S. Appl. No. 14/135,203 (now issued as U.S. 8,830,596).

Non-Final Office Action dated Jun. 5, 2014 for U.S. Appl. No. 14/135,203 (now issued as U.S. 8,830,596).

Non-Final Office Action dated Feb. 26, 2014 for U.S. Appl. No. 14/135,203 (now issued as U.S. 8,830,596).

Notice of Allowance dated May 12, 2014 for U.S. Appl. No. 14/137,683 (now issued as U.S. 8,780,465).

Non-Final Office Action dated Feb. 27, 2014 for U.S. Appl. No. 14/137,683 (now issued as U.S. 8,780,465).

Non-Final Office Action dated Jul. 30, 2014 for U.S. Appl. No. 13/802,247 (now published as U.S. 2013/0286488).

(56) References Cited

OTHER PUBLICATIONS

Non-Final Office Action dated May 9, 2014 for U.S. Appl. No. 13/802,247 (now published as U.S. 2013/0286488).
Non-Final Office Action dated Mar. 11, 2014 for U.S. Appl. No. 13/802,247 (now published as U.S. 2013/0286488).
Final Office Action dated Aug. 20, 2014 for U.S. Appl. No. 14/137,795 (now published as U.S. 2014/0104704).
Non-Final Office Action dated Jun. 3, 2014 for U.S. Appl. No. 14/137,795 (now published as U.S. 2014/0104704).
Final Office Action dated May 8, 2014 for U.S. Appl. No. 14/137,795 (now published as U.S. 2014/0104704).
Non-Final Office Action dated Mar. 18, 2014 for U.S. Appl. No. 14/137,795 (now published as U.S. 2014/0104704).
126. Notice of Allowance dated Jan. 23, 2015 for U.S. Appl. No. 14/473,904 (now published as U.S. 2014/0368928).
Office Action dated Oct. 10, 2014 for U.S. Appl. No. 14/473,904 (now published 2014/0368928).
Office Action dated Nov. 25, 2014 for U.S. Appl. No. 14/473,985 (now published as US 2014/0368930).
Final Office Action dated Jan. 12, 2015 for U.S. Appl. No. 14/473,956 (now published as US 2014/0368929).
Non-Final Office Action dated Oct. 10, 2014 for U.S. Appl. No. 14/473,956 (now published as US 2014/0368929).
Notice of Allowance dated Nov. 6, 2013 for U.S. Appl. No. 13/588,208 (now issued as U.S. 8,675,288).
Notice of Allowance dated May 14, 2014 for U.S. Appl. No. 14/105,096 (now issued as U.S. 8,773,768).
Non-Final Office Action dated Mar. 4, 2014 for U.S. Appl. No. 14/105,096 (now issued as U.S. 8,773,768).
Notice of Allowance dated May 28, 2014 for U.S. Appl. No. 14/105,105 (now issued as U.S. 8,773,769).
Final Office Action dated May 12, 2014 for U.S. Appl. No. 14/105,105 (now issued as U.S. 8,773,769).
Non-Final Office Action dated Feb. 7, 2014 for U.S. Appl. No. 14/105,105 (now issued as U.S. 8,773,769).
Notice of Allowance dated May 22, 2014 for U.S. Appl. No. 14/105,122 (now issued as U.S. 8,773,770).
Final Office Action dated May 12, 2014 for U.S. Appl. No. 14/105,122 (now issued as U.S. 8,773,770).
Non-Final Office Action dated Feb. 4, 2014 for U.S. Appl. No. 14/105,122 (now issued as U.S. 8,773,770).
Office Action dated Oct. 24, 2014 for U.S. Appl. No. 14/473,938 (now published as US 2014/0368932).
Office Action dated Sep. 2, 2014 for U.S. Appl. No. 14/324,003 (now published as U.S. 2014/0320986).
Notice of Allowance dated May 22, 2014 for U.S. Appl. No. 13/434,980 (now issued as U.S. 8,773,780).
Final Office Action dated Mar. 25, 2014 for U.S. Appl. No. 13/434,980 (now issued as U.S. 8,773,780).
Non-Final Office Action dated Jan. 29, 2014 for U.S. Appl. No. 13/434,980 (now issued as U.S. 8,773,780).
Final Office Action dated Sep. 3, 2013 for U.S. Appl. No. 13/434,980 (now issued as U.S. 8,773,780).
Non-Final Office Action dated Feb. 8, 2013 for U.S. Appl. No. 13/434,980 (now issued as U.S. 8,773,780).
Notice of Allowance dated Jun. 26, 2014 for U.S. Appl. No. 14/106,578 (now issued as U.S. 8,810,929).
Non-Final Office Action dated Jan. 29, 2014 for U.S. Appl. No. 14/106,578 (now issued as U.S. 8,810,929).
Notice of Allowance dated Jun. 10, 2014 for U.S. Appl. No. 14/106,598 (now issued ssued as U.S. 8,786,966).
Non-Final Office Action dated Apr. 2, 2014 for U.S. Appl. No. 14/106,598 (now issued as U.S. 8,786,966).
Non-Final Office Action dated May 23, 2014 for U.S. Appl. No. 14/169,121 (now published as U.S. 2014/0146402).

* cited by examiner

IMAGING LENS

CROSS REFERENCE TO RELATED APPLICATION

This application is a continuation of U.S. patent application Ser. No. 14/135,203, filed on Dec. 19, 2013, which is a continuation application of U.S. patent application Ser. No. 13/533,769 filed on Jun. 26, 2012, which claims the benefit of Korean Patent Application Ser. No. 10-2011-0108128, filed on Oct. 21, 2011, entitled "Imaging Lens", which are hereby incorporated by reference in their entireties into this application.

BACKGROUND OF THE INVENTION

1. Technical Field

The present invention relates to an imaging lens.

2. Description of the Related Art

Recently, due to the advancement in technology, mobile terminals such as mobile phones and personal digital assistants (PDAs) are currently used for not only making simple phone calls but to also perform functions for multi-convergence such as playing music or movies, watching TV, and playing games. One of the leading factors for such multi-convergence is a camera module.

In general, a compact camera module (CCM) has a compact size and is applied to portable mobile communication devices such as camera phones, PDAs, and smartphones and various information technology (IT) devices such as toy cameras.

In regard to lenses mounted in conventional camera modules, a four-lens structure is used to realize a high pixel resolution. However, as the pixel size is reduced, it is difficult for the lenses to correspondingly implement the performance thereof.

SUMMARY OF THE INVENTION

The present invention has been made in an effort to provide an imaging lens having excellent optical characteristics.

According to a first preferred embodiment of the present invention, there is provided an imaging lens, including: a first lens having positive (+) power and being biconvex; a second lens having negative (−) power and being concave toward an image side; a third lens having positive (+) power and being biconvex; a fourth lens having positive (+) power and being convex toward the image side; and a fifth lens having negative (−) power and being concave toward the image side, wherein the first lens, the second lens, the third lens, the fourth lens, and the fifth lens are sequentially disposed from an object side.

The second lens, the fourth lens, and the fifth lens may be formed to have a meniscus shape.

A distance TTL from an incident surface of the first lens on the object side to the image side and a total focal length F of the imaging lens may satisfy the following conditional expression:

$$1.1 < TTL/F < 1.35.$$

A curvature radius of the first lens on the object side may be set to be greater than a curvature radius of the first lens on the image side.

A curvature radius of the second lens on the object side may be set to be greater than a curvature radius of the second lens on the image side.

A curvature radius of the third lens on the object side may be set to be greater than a curvature radius of the third lens on the image side.

A curvature radius of the fourth lens on the object side may be set to be greater than a curvature radius of the fourth lens on the image side.

The fifth lens may be formed such that a sweep angle (SWEEP ANGLE) of the fifth lens at an end of an effective diameter of the fifth lens on the image side is equal to or less than 46°.

An inflection point may be formed on each internal surface of the fifth lens on the object side and the image side.

The first lens, the second lens, the third lens, the fourth lens, and the fifth lens may each be formed to be aspherical.

The imaging lens may further include a stop, wherein the stop is disposed closer to the object side or the image side than the first lens.

DESCRIPTION OF THE PREFERRED EMBODIMENTS

Figure 1:
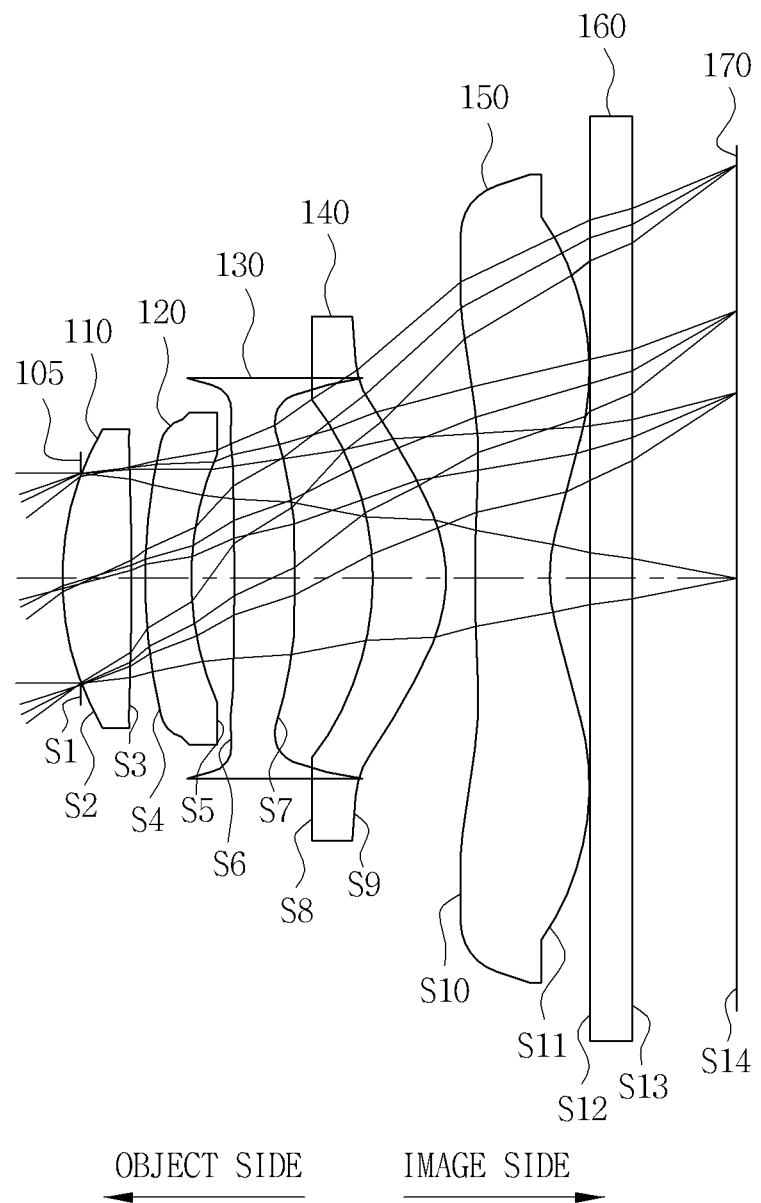
FIG. 1 is a conceptual diagram illustrating an imaging lens according to an embodiment of the present invention.

Various features and advantages of the present invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, in describing the present invention, a detailed description of related known functions or configurations will be omitted so as not to obscure the subject of the present invention. Further, when it is determined that the detailed description of the known art related to the present invention may obscure the gist of the present invention, the detailed description will be omitted.

Hereinafter, the preferred embodiments of the present invention will be described in detail with reference to the accompanying drawings.

FIG. 1 is a conceptual diagram illustrating an imaging lens 100 according to an embodiment of the present invention.

Referring to FIG. 1, the imaging lens 100 includes, a first lens 110, a second lens 120, a third lens 130, a fourth lens 140, and a fifth lens 150 sequentially disposed from an object side. Also, the imaging lens 100 may further include a stop 105 that is disposed closer to the object side or an image side than the first lens 110.

First, to obtain an image of an object (subject), light corresponding to image information of the object sequentially passes through the first lens 110, the stop 105, the second lens 120, the third lens 130, the fourth lens 140, the fifth lens 150, and a filter 160 to be incident on a light receiving device 170.

Here, the first lens 110 has positive (+) power and is biconvex.

Also, the second lens 120 has negative (−) power and a meniscus shape that is concave toward the image side.

In addition, the third lens 130 has positive (+) power and is biconvex. Accordingly, the imaging lens 100 may achieve a high resolution and a slim size.

Also, the fourth lens 140 has positive (+) power and a meniscus shape that is convex toward the image side.

In addition, the fifth lens 150 has negative (−) power and a meniscus shape that is convex toward the image side.

Here, the fifth lens 150 is formed to have an inflection point on each internal surface on the object side and the image side so that a chief ray angle (CRA) of the fifth lens 150 and a CRA of an image sensor, which is a light receiving device, may be matched. Accordingly, ratio of marginal illumination may be improved, and a decrease in productivity of the imaging lens 100 may be prevented.

Meanwhile, the first lens 110 may be formed of a material having a great Abbe number and the second lens 120 may be formed of a material having a small Abbe number, thereby reducing chromatic aberration.

Also, the third lens 130 is formed to have smaller power than the first lens 110.

In addition, the first lens 110, the second lens 120, the third lens 130, the fourth lens 140, and the fifth lens 150 are formed to be aspherical.

Also, the stop 105 is disposed closer to the object side or the image side than the first lens 110, and selectively converges incident light to adjust a focal length.

Meanwhile, the imaging lens 100 according to the embodiment of the present invention may have a focal length F of, for example, 2.8 mm or less and a field of view (FOV) of 60° or greater. However, the focal length F and FOV of the imaging lens 100 according to the present embodiment of the present invention is not limited thereto.

Also, the filter 160 may be formed of an infrared ray blocking filter (IR cut filter), but the type of the filter 160 according to the present embodiment of the present invention is not limited thereto.

The infrared ray blocking filter blocks radiation heat emitted from external light so that the radiation heat is not transferred to the light receiving device 170.

That is, the infrared ray blocking filter transmits visible rays but reflects infrared rays to be emitted to the outside.

Also, the light receiving device 170 having a surface on which an image is formed may be formed of an image sensor that converts an optical signal corresponding to a subject image, to an electrical signal. The image sensor may be, for example, a charged coupled device (CCD) or a complementary metal oxide semiconductor (CMOS), but is not limited thereto.

The imaging lens 100 according to the embodiment of the present invention has optical characteristics as shown in Table 1 below.

TABLE 1

| Lens surface number | Curvature radius (mm) | Thickness (mm) | Refractive index | Abbe number | Lens shape | Remarks |
|---|---|---|---|---|---|---|
| S1 | infinite | 0 | — | — | Flat | Stop |
| S2 | 1.800552 | 0.555385 | 1.544 | 56 | Asphere | L1 |
| S3 | −36.771 | −0.0272 | | | Asphere | |
| S4 | 4.03686 | 0.247717 | 1.632 | 23.4 | Asphere | L2 |
| S5 | 1.680682 | 0.594997 | | | Asphere | |
| S6 | 9.024377 | 0.110811 | 1.544 | 56 | Asphere | L3 |
| S7 | −15.3803 | −0.06502 | | | Asphere | |
| S8 | −2.02202 | −0.49456 | 1.544 | 56 | Asphere | L4 |
| S9 | −0.89994 | −1.11119 | | | Asphere | |
| S10 | 14.46622 | 6.91E−02 | 1.544 | 56 | Asphere | L5 |
| S11 | 1.096596 | 9.12E−01 | | | Asphere | |
| S12 | infinite | | 1.517 | 64.2 | Flat | Filter |
| S13 | infinite | | | | Flat | |
| S14 | infinite | — | — | — | Flat | Image sensor |

As shown in Table 1, all surfaces of the first lens 110 (L1), the second lens 120 (L2), the third lens 130 (L3), the fourth lens 140 (L4), and the fifth lens 150 (L5) of the imaging lens 100 are aspherical.

Also, values denoted by "−" in Table 1 are undefined values.

Also, S1 denotes a surface that determines a light amount of the imaging lens 100 according to the embodiment of the present invention, and Stop marked in the remarks column of S1 denotes the stop 105 (S1) which is used to adjust the light amount.

Here, the stop 105 is disposed closer to the object side than the first lens 110, but the position of the stop 105 according to the embodiment of the present invention is not limited thereto and may also be disposed closer to the image side than the first lens 110.

Table 2 below shows aspheric constants of aspherical lenses of the imaging lens 100 according to an embodiment of the present invention.

TABLE 2

| | K | A | B | C | D | E |
|---|---|---|---|---|---|---|
| S2 | 0 | −0.01413 | −0.00778 | −0.02006 | 0.000785 | 0.0024 |
| S3 | 0 | −0.10971 | 0.337872 | −0.58682 | 0.45104 | −0.09954 |
| S4 | 0 | −0.22546 | 0.614614 | −0.88307 | 0.628083 | −0.13339 |
| S5 | 0 | −0.21613 | 0.435828 | −0.45746 | 0.207889 | −0.00481 |
| S6 | 0 | −0.15862 | 0.071111 | −0.03314 | 0.095271 | −0.04795 |
| S7 | 0 | −0.12057 | 0.020052 | −0.02296 | 0.018017 | 0.014146 |
| S8 | −3.66663 | −0.08874 | 0.07554 | −0.05193 | −0.00164 | 0.00944 |
| S9 | −3.39503 | −0.11595 | 0.129208 | −0.06781 | 0.020968 | −0.0026 |
| S10 | 0 | −0.02978 | −0.01115 | 0.007724 | −0.00134 | 0.000077 |
| S11 | −6.79738 | −0.05291 | 0.013976 | −0.00368 | 0.000539 | −0.00003 |

As shown in Tables 1 and 2, S1 denotes the stop 105 which is used to adjust a light amount. The stop 105 has no aspheric constant because it is flat.

Also, S11 and S12 denote the filter 160, and S13 denotes the image sensor which is the light receiving device 170 and has no aspheric constant because it is flat.

In addition, an aspheric constant regarding the imaging lens 100 according to the embodiment of the present invention may be calculated according to Equation 1 below.

$$Z(h) = \frac{ch^2}{1+\sqrt{1-(1+k)c^2h^2}} + Ah^4 + Bh^6 + Ch^8 + Dh^{10} + Eh^{12} \quad \text{[Equation 1]}$$

Z: distance from a vertex of a lens in an optical axis direction c: basic curvature of a lens h: distance from a vertex of a lens in a direction perpendicular to the optical axis K: Conic Constant A, B, C, D, E: Aspheric Constant A total focal length F of the imaging lens 100 according to the embodiment of the present invention and focal lengths F1, F2, F3, F4, and F5 of the first lens 110, the second lens 120, the third lens 130, the fourth lens 140, and the fifth lens 150 are as shown in Table 3 below.

TABLE 3

| Item | |
|---|---|
| Total focal length F of imaging lens | 3.87E+00 |
| Focal length of the first lens (F1) | 3.155091 |
| Focal length of the second lens (F2) | −4.74182 |
| Focal length of the third lens (F3) | 10.47052 |
| Focal length of the fourth lens (F4) | 2.549882 |
| Focal length of the fifth lens (F5) | 4.9916 |
| TTL | 4.8 |
| Sweep angle | 37 |

A distance TTL from an incident surface of the first lens 110 on the object side to the image side and the total focal length F of the imaging lens 100 may satisfy the following conditional expression.

$$1.1 < TTL/F < 1.35 \quad (1)$$

The conditional expression (1) is a relational expression about a relationship between the distance TTL and power of the imaging lens 100 according to the embodiment of the present invention. If the imaging lens 100 is designed to have a value greater than the conditional expression (1), productivity of the imaging lens 100 may decrease, and if the imaging lens 100 is designed to have a value smaller than the conditional expression (1), it is difficult to provide optical performance of the imaging lens 100.

Accordingly, by satisfying the conditional expression (1), the imaging lens 100 may be manufactured with high productivity and it may be easy to provide optical performance of the imaging lens 100.

Also, a curvature radius rdy s2 of the first lens 110 on the object side and a curvature radius rdy s3 of the first lens 110 on the image side according to the embodiment of the present invention may satisfy the following conditional expression.

$$\text{rdy s3} < \text{rdy s2} \quad (2)$$

The conditional expression (2) is related to characteristics of the curvature radius of the first lens 110 according to the embodiment of the present invention; by setting the curvature radius of the first lens 110 on the object side to be greater than the curvature radius of the first lens 110 on the image side, shape tolerance may be reduced.

Also, a curvature radius rdy s4 of the second lens 120 on the object side and a curvature radius rdy s5 of the second lens 120 on the image side according to the embodiment of the present invention may satisfy the following conditional expression.

$$\text{rdy s5} < \text{rdy s4} \quad (3)$$

The conditional expression (3) is related to characteristics of the curvature radius of the second lens 120 according to the embodiment of the present invention; by setting the curvature radius of the second lens 120 on the object side to be greater than the curvature radius of the second lens 120 on the image side, sensitivity of the second lens 120 may be reduced, but at the same time, the lenses having a better shape may be formed during injection molding.

Also, a curvature radius rdy s6 of the third lens 130 on the object side and a curvature radius rdy s7 of the third lens 130 on the image side according to the embodiment of the present invention may satisfy the following conditional expression.

$$\text{rdy s7} < \text{rdy s6} \quad (4)$$

The conditional expression (4) is related to characteristics of the curvature radius of the third lens 130 according to the embodiment of the present invention; by setting the curvature radius of the third lens 130 on the object side to be greater than the curvature radius of the third lens 130 on the image side, the overall sensitivity of the third lens 130 may be reduced, but at the same time, an inflection point on each surface of the third lens 130 may be minimized.

Also, a curvature radius rdy s8 of the fourth lens 140 on the object side and a curvature radius rdy s9 of the fourth lens 140 on the image side according to the embodiment of the present invention may satisfy the following conditional expression.

$$\text{rdy s9} < \text{rdy s8} \quad (5)$$

The conditional expression (5) is related to characteristics of the curvature radius of the fourth lens 140 according to the embodiment of the present invention. The curvature radius of the fourth lens 140 on the object side is set to be greater than the curvature radius of the fourth lens 140 on the image side. When the curvature radius of the fourth lens 140 on the object side is set to be smaller than that of the fourth lens 140 on the image side, the distance TTL from the incident surface of the first lens on the object side to the image side is not reduced, thereby deteriorating aberration characteristics.

Accordingly, by satisfying the conditional expression (5), the distance TTL from the incident surface of the first lens on the object side to the image side may be reduced, and aberration characteristics may be improved.

In addition, a sweep angle L5 S11 A at an end of an effective diameter of the fifth lens 150 on the image side may satisfy the following conditional expression.

$$\text{L5 S11 A} < 46° \quad (6)$$

The conditional expression (6) represents a condition under which total internal reflection of the fifth lens 150 is minimized.

Here, a sweep angle refers to an angle between the object side and the image side, which is measured from an end of the fifth lens 150 on the image side.

If the sweep angle L5 S11 A is greater than 46°, strong internal reflection is generated when capturing an image due to reflection of the fifth lens 150 on the image side and total reflection of the fifth lens 150 on the object side, and this causes deterioration of image quality.

Accordingly, by satisfying the conditional expression (6), generation of internal reflection may be reduced when capturing an image, thereby preventing deterioration of image quality.

Figure 2:
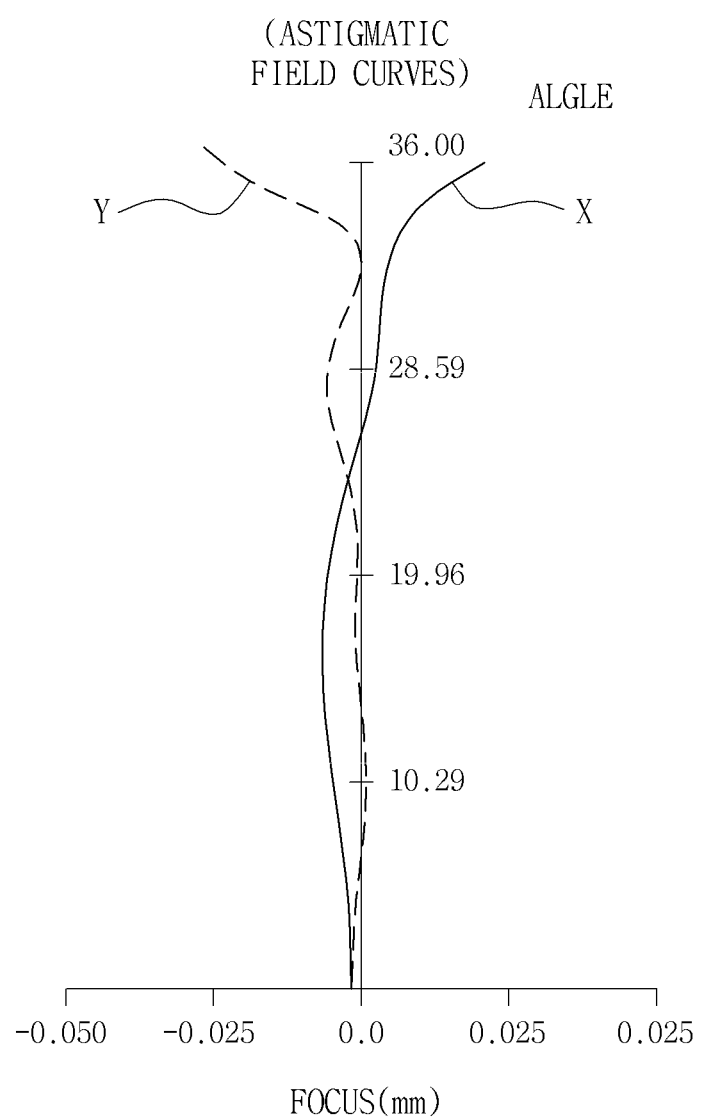
FIG. 2 is a graph showing astigmatic field curves of the imaging lens according to an embodiment of the present invention.
Figure 3:
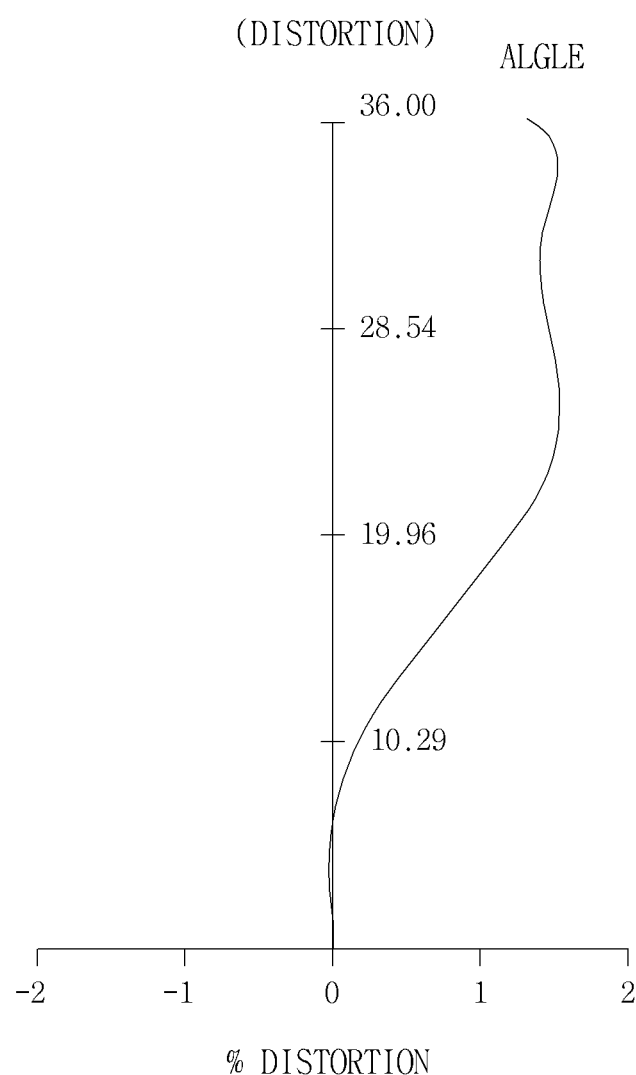
FIG. 3 is a graph showing distortion of the imaging lens according to an embodiment of the present invention.
Figure 4:
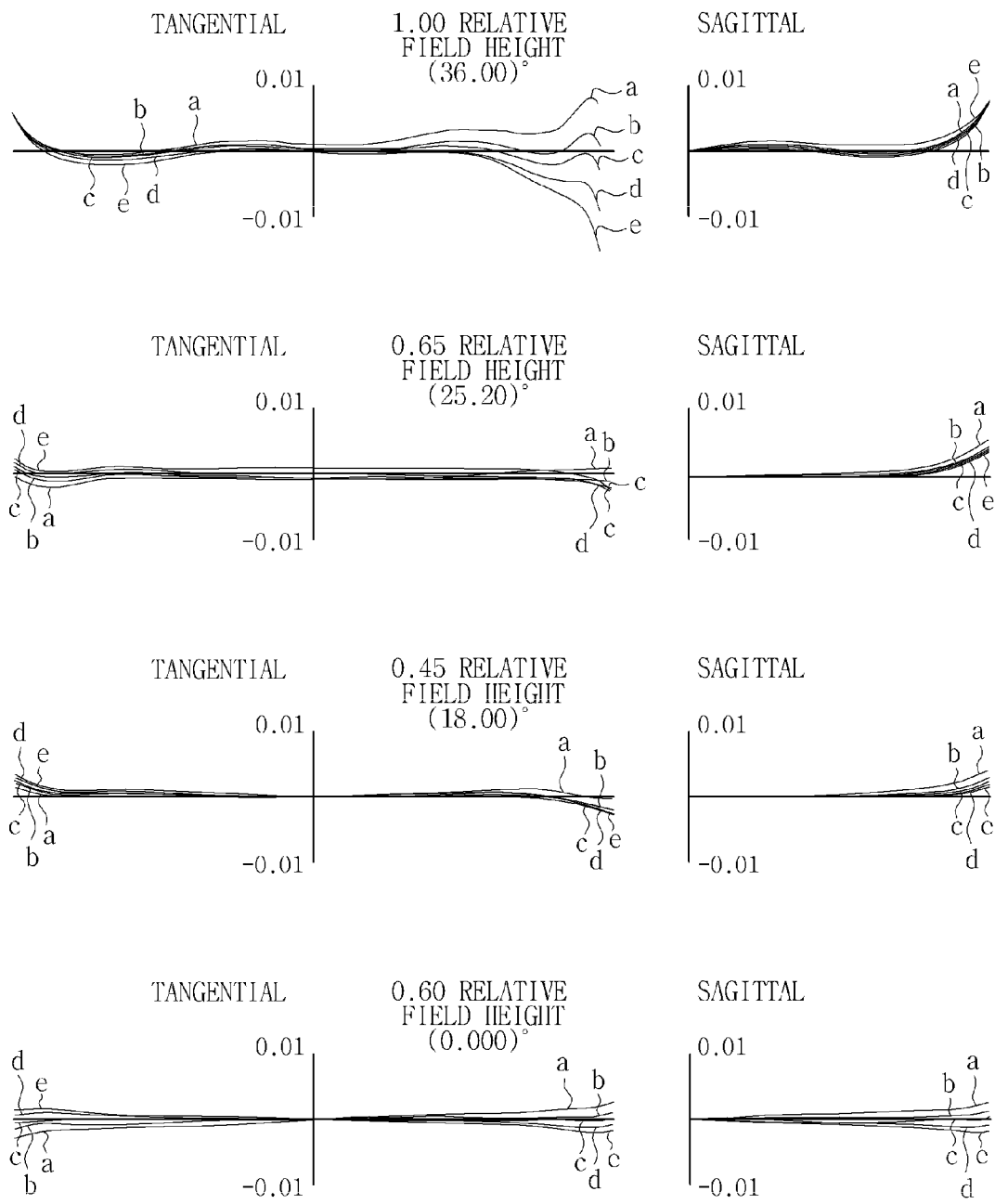
FIG. 4 is a graph showing coma aberration of the imaging lens according to an embodiment of the present invention.

FIG. 2 is a graph showing astigmatic field curves of the imaging lens 100 according to an embodiment of the present invention. FIG. 3 is a graph showing distortion of the imaging lens 100 according to an embodiment of the present invention. FIG. 4 is a graph showing coma aberration of the imaging lens 100 according to an embodiment of the present invention.

As illustrated in FIG. 2, the graph of astigmatic field curves shows aberration characteristics of a directional component X of light on the x-axis and a directional component Y of light on the y-axis according to an image height (ANGLE) seen from the object side, which is a vertical axis, and a focus position (FOCUS), which is a horizontal axis. Here, as can be seen from the graph of FIG. 2, X and Y are adjacent to each other, and thus, images do not diffuse and resolving power thereof is not deteriorated.

Also, as shown in FIG. 3, the graph shows distortion shown on a horizontal axis according to an image height (ANGLE) seen from the object side. Here, as can be seen from distortion that is mainly between 1.5 and 1.7 on the horizontal axis, there is substantially little distortion.

In addition, as shown in FIG. 4, the graph of the coma aberration shows tangential and sagittal aberration characteristics according to wavelengths according to an image height. Here, it can be seen that as wavelengths are adjacent to a horizontal axis, there is little yellow aberration.

According to the preferred embodiments of the present invention, an imaging lens having excellent optical characteristics may be manufactured so as to obtain high resolution and a slim size of the imaging lens, and also, chromatic aberrations may be improved.

Although the embodiments of the present invention has been disclosed for illustrative purposes, it will be appreciated that the imaging lens according to the invention is not limited thereto, and those skilled in the art will appreciate that various modifications, additions and substitutions are possible, without departing from the scope and spirit of the invention.

Also, all simple modifications and changes will be construed as being included in the present invention, and the specific scope of the invention is defined by the appended claims.

What is claimed is:

1. An imaging lens, comprising:
    a first lens having positive (+) power and being convex toward an object side;
    a second lens having negative (−) power and being concave toward an image side;
    a third lens having positive (+) power and being convex toward the image side;
    a fourth lens having a power and being convex toward the image side; and
    a fifth lens having a power and being concave toward the image side, wherein an object-side surface of the fifth lens is convex in the center and concave at the periphery, and at least one inflection point is formed on an image-side surface of the fifth lens,
    wherein:
        the first lens, the second lens, the third lens, the fourth lens, and the fifth lens are sequentially disposed from the object side toward the image side,
        the second lens, the fourth lens, and the fifth lens have a meniscus shape,
        a radius of curvature of an object-side surface of the second lens is greater than a radius of curvature of an image-side surface of the second lens,
        a radius of curvature of an object-side surface of the fourth lens is greater than a radius of curvature of an image-side surface of the fourth lens, and
        the fourth lens is thicker than the third lens.

2. The imaging lens of claim 1, wherein a distance TTL on an optical axis from an object-side surface of the first lens to an image sensor and a total focal length F of the imaging lens satisfy the following conditional expression:

$$1.1 < TTL/F \leq 1.35.$$

3. The imaging lens of claim 1, wherein the third lens has a smaller power than the first lens.

4. The imaging lens of claim 1, wherein the second lens is convex toward the object side.

5. The imaging lens of claim 4, wherein the fourth lens is concave toward the object side.

6. The imaging lens of claim 5, wherein the image-side surface of the fifth lens is concave in the center and convex at the periphery.

7. The imaging lens of claim 6, further comprising a stop disposed in front of the first lens,
    wherein the first lens, the second lens, the third lens, the fourth lens, and the fifth lens are formed to be aspherical, and an Abbe number of the first lens is greater than an Abbe number of the second lens.

8. The imaging lens of claim 6, wherein a sweep angle of the fifth lens at an end of an effective diameter of the fifth lens on the image side is equal to or less than 46°.

9. The imaging lens of claim 6, wherein a focal length of the third lens is greater than a focal length of the fourth lens, the first lens is thicker than the fourth lens, and a radius of curvature of an object-side surface of the fifth lens is greater than a radius of curvature of an image-side surface of the fifth lens.

10. The imaging lens of claim 6, wherein a focal length of the third lens is greater than a focal length of the first lens, and the focal length of the first lens is greater than a focal length of the fourth lens.

11. The imaging lens of claim 1, wherein a distance TTL on an optical axis from an object-side surface of the first lens to an image sensor and a total focal length F of the imaging lens satisfy the following conditional expression:

$$1.1 < TTL/F \leq 1.24.$$

12. An imaging lens, comprising:
    a first lens having positive (+) power and being convex toward an object side;
    a second lens having negative (−) power and being convex toward the object side and concave toward an image side;
    a third lens having positive (+) power and being convex toward the image side;
    a fourth lens having a power and being concave toward the object side and convex toward the image side; and
    a fifth lens having a power and comprising:
        an object-side surface being convex in the center and concave at the periphery; and
        an image-side surface being concave in the center and convex at the periphery,
    wherein:
        the first lens, the second lens, the third lens, the fourth lens, and the fifth lens are sequentially disposed from the object side toward the image side, the second lens, the fourth lens, and the fifth lens have a meniscus shape,
a radius of curvature of an object-side surface of the second lens is greater than a radius of curvature of an image-side surface of the second lens,
a radius of curvature of an object-side surface of the fourth lens is greater than a radius of curvature of an image-side surface of the fourth lens, and
the fourth lens is thicker than the third lens.

13. The imaging lens of claim 12, wherein:
a distance TTL on an optical axis from an object-side surface of the first lens to an image sensor and a total focal length F of the imaging lens satisfy the following conditional expression:

$$1.1 < TTL/F \le 1.35,$$

the third lens has a smaller power than the first lens, and
a sweep angle of the fifth lens at an end of an effective diameter of the fifth lens on the image side is equal to or less than 46°.

14. The imaging lens of claim 12, wherein:
a focal length of the third lens is greater than a focal length of the fourth lens and a focal length of the first lens is greater than the focal length of the fourth lens,
the first lens is thicker than the fourth lens, and
a radius of curvature of the object-side surface of the fifth lens is greater than a radius of curvature of the image-side surface of the fifth lens.

15. The imaging lens of claim 14, wherein a focal length of the third lens is greater than the focal length of the first lens.

16. An imaging lens, comprising:
a first lens having positive (+) power and being convex toward an object side;
a second lens having negative (−) power and being concave toward an image side;
a third lens having positive (+) power and being convex toward the image side;
a fourth lens having a power and being convex toward the image side; and
a fifth lens having a power and being concave toward the image side, wherein an object-side surface of the fifth lens is convex in the center and concave at the periphery, and at least one inflection point is formed on an image-side surface of the fifth lens,
wherein:
the first lens, the second lens, the third lens, the fourth lens, and the fifth lens are sequentially disposed from the object side toward the image side,
the second lens, the fourth lens, and the fifth lens have a meniscus shape,
a radius of curvature of an object-side surface of the fourth lens is greater than a radius of curvature of an image-side surface of the fourth lens,
a distance TTL on an optical axis from an object-side surface of the first lens to an image sensor and a total focal length F of the imaging lens satisfy the following conditional expression:

$$1.1 < TTL/F < 1.35, \text{ and}$$

the fourth lens is thicker than the third lens.

17. The imaging lens of claim 16, wherein a radius of curvature of an object-side surface of the second lens is greater than a radius of curvature of an image-side surface of the second lens.

18. The imaging lens of claim 16, wherein the third lens has a smaller power than the first lens.

19. The imaging lens of claim 18, wherein the second lens is convex toward the object side.

20. The imaging lens of claim 19, wherein the fourth lens is concave toward the object side.

21. The imaging lens of claim 20, wherein an image-side surface of the fifth lens is concave in the center and convex at the periphery.

22. The imaging lens of claim 21, wherein the first lens, the second lens, the third lens, the fourth lens, and the fifth lens are formed to be aspherical.

23. The imaging lens of claim 21, wherein an Abbe number of the first lens is greater than an Abbe number of the second lens.

24. The imaging lens of claim 21, further comprising a stop disposed in front of the first lens.

25. The imaging lens of claim 21, wherein a sweep angle of the fifth lens at an end of an effective diameter of the fifth lens on the image side is equal to or less than 46°.

26. The imaging lens of claim 21, wherein:
a focal length of the third lens is greater than a focal length of the first lens and the focal length of the first lens is greater than a focal length of the fourth lens,
the first lens is thicker than the fourth lens, and
a radius of curvature of the object-side surface of the fifth lens is greater than a radius of curvature of the image-side surface of the fifth lens.

27. The imaging lens of claim 16, wherein a distance TTL on an optical axis from an object-side surface of the first lens to an image sensor and a total focal length F of the imaging lens satisfy the following conditional expression:

$$1.1 < TTL/F \le 1.24.$$

28. An imaging lens, comprising:
a first lens having positive (+) power and being convex toward an object side;
a second lens having negative (−) power and being convex toward the object side and concave toward an image side;
a third lens having positive (+) power and being convex toward the image side;
a fourth lens having a power and being concave toward the object side and convex toward the image side; and
a fifth lens having a power and comprising:
an object-side surface being convex in the center and concave at the periphery; and
an image-side surface being concave in the center and convex at the periphery,
wherein:
the first lens, the second lens, the third lens, the fourth lens, and the fifth lens are sequentially disposed from the object side toward the image side,
the second lens, the fourth lens, and the fifth lens have a meniscus shape,
a radius of curvature of an object-side surface of the fourth lens is greater than a radius of curvature of an image-side surface of the fourth lens,
a radius of curvature of an object-side surface of the second lens is greater than a radius of curvature of an image-side surface of the second lens,
the third lens has a smaller power than the first lens,
a distance TTL on an optical axis from an object-side surface of the first lens to an image sensor and a total focal length F of the imaging lens satisfy the following conditional expression:

$$1.1 < TTL/F < 1.35, \text{ and}$$

the fourth lens is thicker than the third lens.

29. The imaging lens of claim 28, wherein a sweep angle of the fifth lens at an end of an effective diameter of the fifth lens on the image side is equal to or less than 46°.

30. The imaging lens of claim 29, wherein:
- a focal length of the third lens is greater than a focal length of the first lens, and the focal length of the first lens is greater than a focal length of the fourth lens,
- the first lens is thicker than the fourth lens, and
- a radius of curvature of the object-side surface of the fifth lens is greater than a radius of curvature of the image-side surface of the fifth lens.

* * * * *